United States Patent [19]

Lacher

[11] 4,229,831
[45] Oct. 21, 1980

[54] DRIFT COMPENSATED FIBER OPTIC-RECEIVER

[75] Inventor: William A. Lacher, Lansdale, Pa.

[73] Assignee: Burroughs Corporation, Detroit, Mich.

[21] Appl. No.: 972,502

[22] Filed: Dec. 22, 1978

[51] Int. Cl.³ .............................................. H04B 9/00
[52] U.S. Cl. ....................................... 455/619; 375/94
[58] Field of Search ................ 250/199; 178/68, 66.1; 375/37, 94; 455/619

[56] References Cited

U.S. PATENT DOCUMENTS

| | | | |
|---|---|---|---|
| 3,187,260 | 6/1965 | Dove | 178/68 |
| 3,461,390 | 8/1969 | Mack | 178/68 |
| 3,465,101 | 9/1969 | Christian | 178/68 |
| 3,514,706 | 5/1970 | Dupraz | 178/68 |
| 3,519,938 | 7/1970 | Smith | 178/68 |
| 4,027,152 | 5/1977 | Brown | 250/199 |
| 4,051,363 | 9/1977 | Fish | 250/199 |

*Primary Examiner*—Howard W. Britton

*Attorney, Agent, or Firm*—Francis A. Varallo; Leonard C. Brenner; Kevin R. Peterson

[57] ABSTRACT

The present disclosure describes an electronic circuit for use as a receiver in digital fiber-optic systems. It is the nature of such systems that considerable amplification is required at the receiving terminus to bring to useful signal levels the electrical energy provided by photodetectors in response to the light incident thereupon. However, the photodetectors and amplifiers themselves contribute noise currents which vary with temperature and operational amplifiers have a characteristic initial dc offset. Accordingly, while receivers for fiber-optic systems have been complicated and expensive, the receiver of the present invention is neither of these. It amplifies the small signals from the photodetector to a suitable level, eliminates the effects of the aforementioned dc offset, rejects any long-term drift and provides output signals of any duration from a bistable stage, which signals correspond to the original digital information transmitted by the system.

7 Claims, 3 Drawing Figures

DRIFT COMPENSATED FIBER OPTIC-RECEIVER

BACKGROUND OF THE INVENTION

In the transmission of signals via optical fibers, both analog and digital modulation of the light source is utilized in different applications. Recently, digital transmission has become more prominent due to its inherent error reducing capabilities. Considering the latter, the digital information to be transmitted modulates a light source, such as a light emitting diode (LED) or a solid-state laser diode (ILD). The light from such a source is propagated through the optical fiber or light pipe by total internal reflection. At the receiving terminus, the light is directed upon a photodetector. The latter may be, for example, either a PIN photodiode or an avalanche photodiode (APD). The small energy levels produced by the photodetector are thus amplified and converted back to digital form for further use.

While the transmitters for use in such digital systems are easily designed and relatively low cost, the receivers involve complicated circuits and are expensive. The reason for this stems from the relatively small amount of light arriving at the receiving terminus and the limited sensitivity of the photodetectors. The former results from two major causes, namely attenuation within the light pipe itself and input coupling losses where only a fraction of the source's radiant power is actually coupled into the fiber and waveguided. Accordingly, it is apparent that a large amount of amplification is needed to bring the small signal input from the photodetector to a useful level.

Several problems arise in the design of amplifiers for digital systems using photodetectors as their input sources. One of these involves a noise component within PIN photodiodes caused by fluctuations in dark current. The latter current flows through the diode-biasing circuit when no light is incident on the photodiode. An average dc value for dark current is usually specified by the manufacturer at a given temperature and bias voltage. However, it is known that dark current shot-noise power varies linearly with this average. Dark current increases with temperature and substantially doubles in amplitude for every 10 degrees Celsius increase in operating temperature. Another problem in amplifier design stems from the initial dc offset inherent in all operational amplifiers. When the aforementioned variables are in their worst-case direction, it is impossible to predict over a long period of time, the integrity of the signal levels exiting the receiver.

In view of the foregoing, it is apparent that the need exists for a low-cost optical system for dc transmission of information. The receiver of the present invention, characterized by simplicity of design and economy, provides the required amplification of the photodetector signals, while rejecting any long-term drift. As such, it may be advantageously employed in the aforementioned system.

BRIEF DESCRIPTION OF THE INVENTION

In accordance with the invention, it may be assumed that a digital signal is being transmitted down an optical fiber or light pipe by simply turning the transmitter on and off. The very small voltages generated in response to light incident upon a photodetector are amplified to a predetermined amplitude. The amplification may be readily accomplished through the use of one or more operational amplifiers. The output signals from the latter, while being of the proper amplitude, may have a dc baseline which is not necessarily at ground potential. This condition results from the initial dark current of the photodetector and any dc offset in the amplifiers which are in turn multiplied by the amplifier gain. Accordingly, the square-wave output signals of the amplifier are ac coupled and referenced to ground potential by a differentiator network. The resulting positive and negative going edges of the waveforms are applied in common to the inputs of two comparators which are biased respectively to opposite polarities. The outputs of the comparators are then applied in common to one input terminal of a bistable device, such as a flip-flop. The latter is driven from one state to its opposite state in response to signals from the comparators, thereby providing an output corresponding to the original digital information transmitted down the light pipe. The flip-flop provides for true digital transmission in that it may remain in one state or the other indefinitely, and is therefore insensitive to the repetition rate of the transmitted data.

From the foregoing brief description, it should be noted that the present receiver offers the following advantages, in addition to its simplicity and economy. It may be used in a low-cost system with a simple on-off transmitter design. No special component selection is required in the receiver design and since no drift is inherent therein, no drift compensation, such as might otherwise be performed by periodic potentiometer adjustments, is necessary. The receiver design is applicable to systems of any transmission speed. Other features and advantages of the present invention will become apparent in the detailed description appearing hereinafter.

DESCRIPTION OF THE PREFERRED EMBODIMENT

Figure 1:
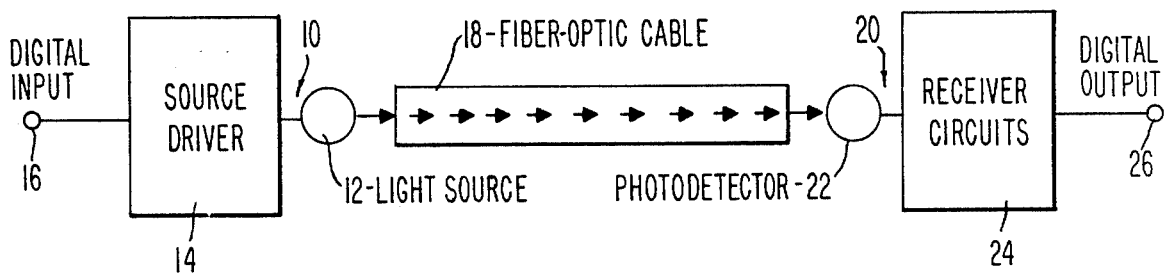
FIG. 1 illustrates schematically a typical one-way fiber-optic data transmission system.

FIG. 1 illustrates a highly simplified data transmission system using fiber-optic techniques. Basically, the system is comprised of a transmitter 10 which includes a light source 12 and a source driver 14. The driver 14 is designed to modulate the light source 12 in accordance with the digital signals applied to its input terminal 16. The light source 12 may be of various types—the most commonly used being the light emitting diode (LED) or the solid-state laser diode (ILD). The modulated light from source 12 is transmitted down the fiber-optic cable 18 in the direction of the arrows to the receiver assembly 20, which comprises generally a photodetector 22 and the receiver circuits 24. The latter circuits provide on output terminal 26, digital signals corresponding to those applied to input terminal 16. The photodetector 22 may also be of various types depending upon application requirements. Two types presently being used in such systems are the PIN photodiode and the avalanche diode (APD).

Figure 3:
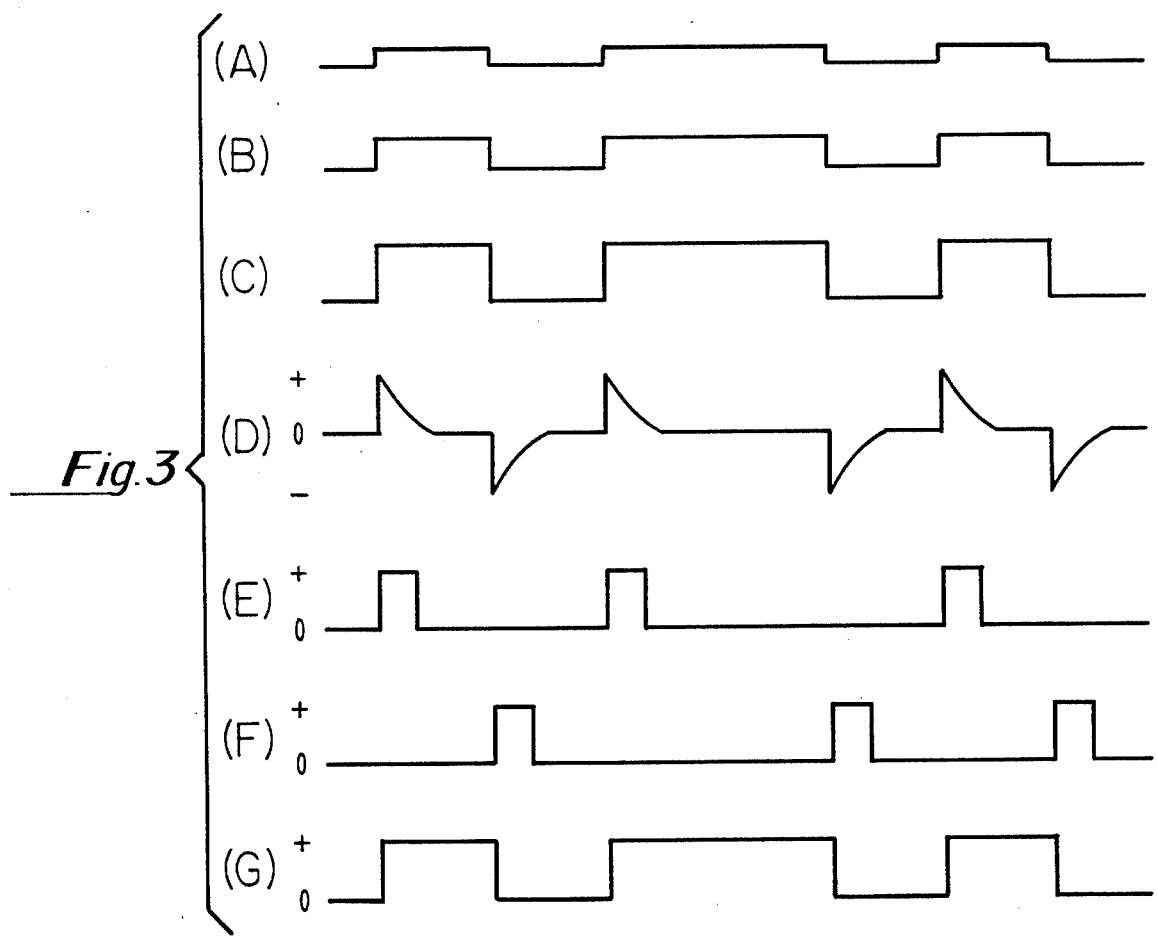
FIG. 3 is a timing diagram illustrating the wave forms appearing at selected points in the schematic of FIG. 2 during the operation of the receiver.
Figure 2:
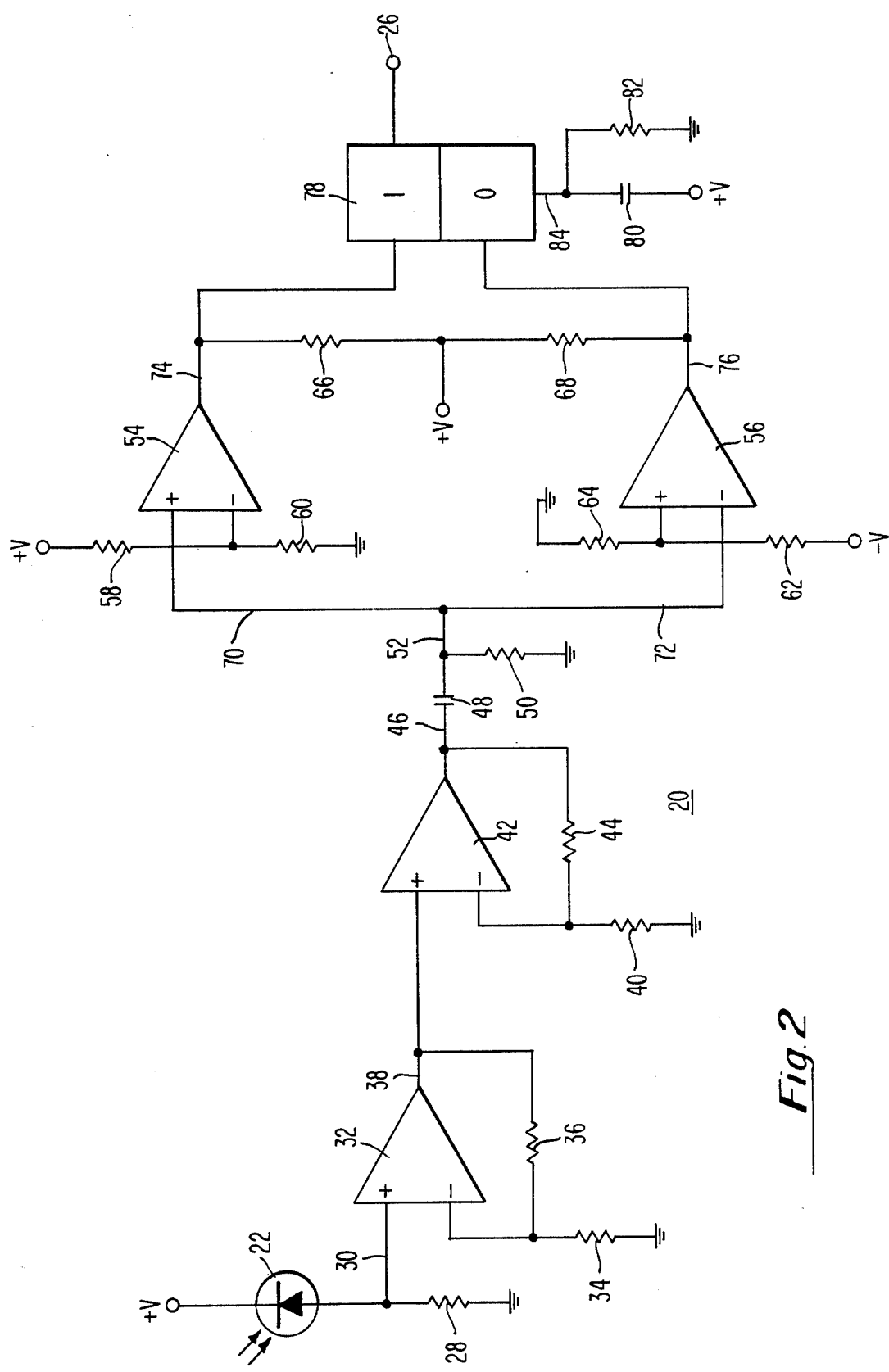
FIG. 2 is a schematic diagram of the receiver portion of the system of FIG. 1.

With reference to FIG. 2, the schematic diagram for receiver 20 of the present invention and FIG. 3, a timing diagram illustrating the waveforms appearing in FIG. 2, the operation of the receiver 20 will be described.

It may be assumed that light modulated in accordance with input digital data has been transmitted down the fiber-optic cable 18 (FIG. 1) and is incident upon photodetector 22 at the receiving terminus of the system. Photodetector 22 is connected in series with resistor 28 and the combination is coupled to a positive voltage source, +V. Current flowing in the photodetector circuit causes a small signal voltage, as seen in FIG. 3A, to be developed across resistor 28. The last mentioned voltage, which may be of the order of 1 millivolt, is applied via line 30 to the non-inverting input of operational amplifier 32, and is amplified in accordance with the ratio of the resistance values of resistors 34 and 36. Assuming the gain of amplifier 32 to be ten a 10 millivolt signal as seen in FIG. 3B will appear at the output of amplifier 32 on line 38. The signal is then applied to the non-inverting input of the succeeding operational amplifier 42. Assuming that the gain of this last amplifier is fifteen as determined by the ratio of resistors 40 and 44, the output signal appearing on line 46 and shown in FIG. 3C has an amplitude of 1.5 volts. The dc baseline of the signal in FIG. 3C is not necessarily at ground potential, because of the initial dark current of photodetector 22 and the dc offsets of amplifiers 32 and 42 which are multiplied by the respective amplifier gains. In order to use the signals appearing in FIG. 3C and reference them to ground potential, the signals are ac coupled to the succeeding stages by capacitor 48 and referenced to ground by resistor 50. It should be noted that in true digital systems, the repetition rate of the transmitted data should be capable of having a range from dc to its maximum design value. Since at low frequencies, the value of capacitor 48 would be prohibitively large, the network comprised of capacitor 48 and resistor 50 is designed to differentiate the square wave signals appearing on line 46. The values of capacitor 48 and resistor 50 may be chosen to permit recovery in half the time period for the highest frequency input data applied to the system. The output of the differentiator network appears on line 52, as seen in FIG. 3D. Only the respective positive and negative going leading edges of the waveforms in FIG. 3D are utilized in the succeeding stages.

A pair of comparators 54 and 56 respectively are provided. Comparator 54 is biased positively by virtue of the potential appearing on its negative input terminal. This bias potential is derived from a divider network in which series resistors 58 and 60 are connected between a positive voltage source, +V and ground potential. Comparator 56, on the other hand is negatively biased. The bias potential is derived from the resistive network comprised of resistors 62 and 64 connected between a negative source, −V, and ground, and is coupled to the positive terminal of comparator 56. Both comparators are coupled via respective resistors 66 and 68 to a common voltage source, +V.

The differentiated signals (FIG. 3D) appearing on line 52 are applied via line 70 to the positive terminal of comparator 54 and via line 72 to the negative terminal of comparator 56. When a positive going pulse is seen on line 52, a positive pulse as illustrated in FIG. 3E appears at the output of comparator 54 on line 74. The pulse amplitude may be of the order of 2.5 volts. When a negative going pulse appears at the output of the differentiation network on line 52, a positive pulse (FIG. 3F) is produced at the output of comparator 56 on line 76. Similarly, the pulse amplitude may be 2.5 volts.

The output stage of receiver 20 is a flip-flop 78. The positive pulse on line 74 is applied to the "1" input terminal of flip-flop 78, thereby tending to set it in the "1" state. On the other hand, a positive pulse on line 76 is applied to the "0" input terminal, thereby placing flip-flop 78 in its opposite, or "0" state. An output from flip-flop 78 appears on output terminal 26 which is coupled to the "1" side thereof. Reference to FIG. 3G, showing the receiver output on terminal 26, indicates that the original digital information represented by the small signal levels of FIG. 3A have been restored and amplified to usuable levels (approximately 2.5 volts) in receiver 20. Flip-flop 78 retains its state indefinitely, and accordingly is not repetition-rate sensitive. A network comprised of a series connected capacitor 80 and resistor 82 coupled between the +V source and ground may be provided. The junction of capacitor 80 and resistor 82 is coupled via line 84 to a "0" input terminal of flip-flop 76 to preset the latter to the "0" state when power is first turned on at the receiver. The last mentioned network may be eliminated at the expense of the possible loss of the first information pulse since the receiver will automatically lock-in to the subsequent signals.

In conclusion, it is submitted that the fiber-optic system receiver taught by the present invention finds particular application in low-cost optical systems. It should be understood that the various circuit parameters mentioned in the course of the description of the receiver operation, have been included solely for purposes of example and are not limitative of the invention. Moreover, changes and modifications of the circuit organization presented herein may be needed to suit particular requirements. Such changes and modifications are well within the skill of the electronics circuit designer, and insofar as they are not departures from the true scope and spirit of the invention, are intended to be covered by the following claims.

What is claimed is:

1. A receiver for use in a fiber-optic system for the transmission of digital data comprising:

photodetector means responsive to the transmitted light incident thereupon for generating electrical pulses corresponding respectively to said digital data, amplifier means coupled to said photodetector means for amplifying said electrical pulses to a predetermined level, differentiator means coupled to said amplifier means for differentiating the amplified electrical pulses, thereby providing with respect to a reference potential a pair of signals of opposite polarity for each amplified pulse, a pair of comparator means coupled to said differentiator means and biased to respective opposite polarities, each of said pair of comparator means providing an output pulse in response to one of said pair of signals of opposite polarity from said differentiator means, flip-flop means having at least a "1" and a "0" input terminal and a "1" output terminal, means coupling the output pulses of one of said pair of comparator means to said "1" input terminal and the output pulses of the other of said pair of comparator means to said "0" input terminal, the switching of said flip-flop means from one stable state to its opposite state in response to the pulses applied alternately to its "1" and "0" input terminals generating output signal waveforms on said "1" output terminal which are of a predetermined usable amplitude and which correspond directly to said digital data transmitted optically by said system.

2. A receiver as defined in claim 1 characterized in that said photodetector means comprises the series circuit combination of a photodiode and a resistor interposed between a voltage source and said reference potential, said electrical pulses generated by said photodiode resulting from the voltage developed across said resistor in response to the magnitude of current flow in said circuit as controlled by said photodiode.

3. A receiver as defined in claim 2 wherein said amplifier means includes at least one operational amplifier.

4. A receiver as defined in claim 3 further characterized in that said differentiator means includes a resistor/capacitor network wherein said capacitor and resistor are series connected between the output of said operational amplifier and said reference potential.

5. A receiver as defined in claim 4 further characterized in that the respective values of the resistor and capacitor of said differentiator means permit recovery in substantially one half of the time period for the highest frequency digital data transmitted by said system.

6. A receiver as defined in claim 5 further characterized in that said pair of comparators are energized in common from said voltage source, whereby the pulses generated respectively thereby and applied to said flip-flop means are of the same polarity.

7. A receiver as defined in claim 6 further including a resistor and a capacitor in series relationship and interposed between said voltage source and said reference potential, the junction of said resistor and capacitor being coupled to a "0" input terminal of said flip-flop means, whereby the initial actuation of said voltage source in preparation for the operation of said receiver causes a signal to be applied to said last mentioned "0" input terminal which is capable of resetting said flip-flop means.

* * * * *